No. 678,719.  
J. E. CLARK.  
TIRE BOLTER AND CUTTER.  
(Application filed Apr. 4, 1901.)
Patented July 16, 1901.
(No Model.)
2 Sheets—Sheet 2.
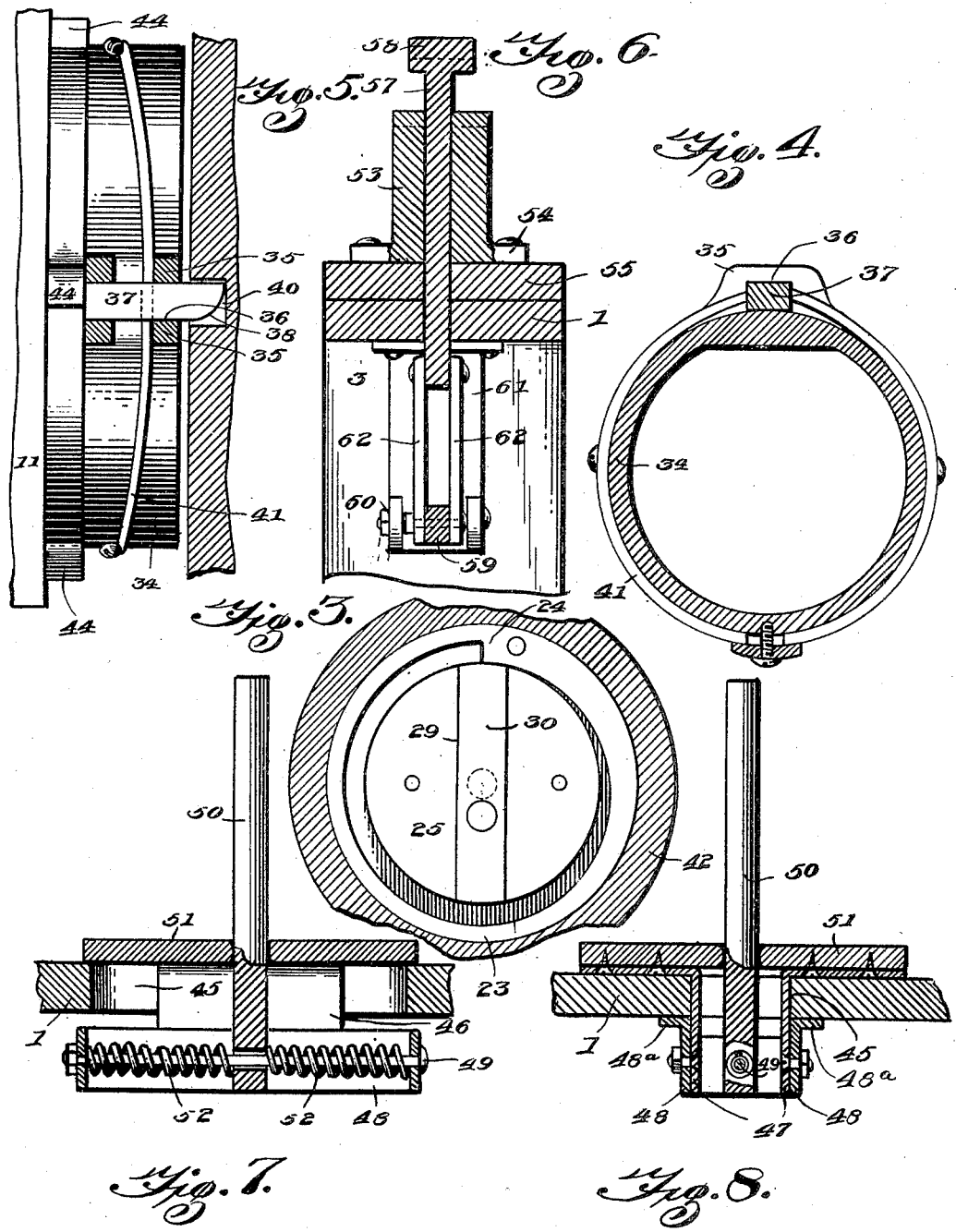

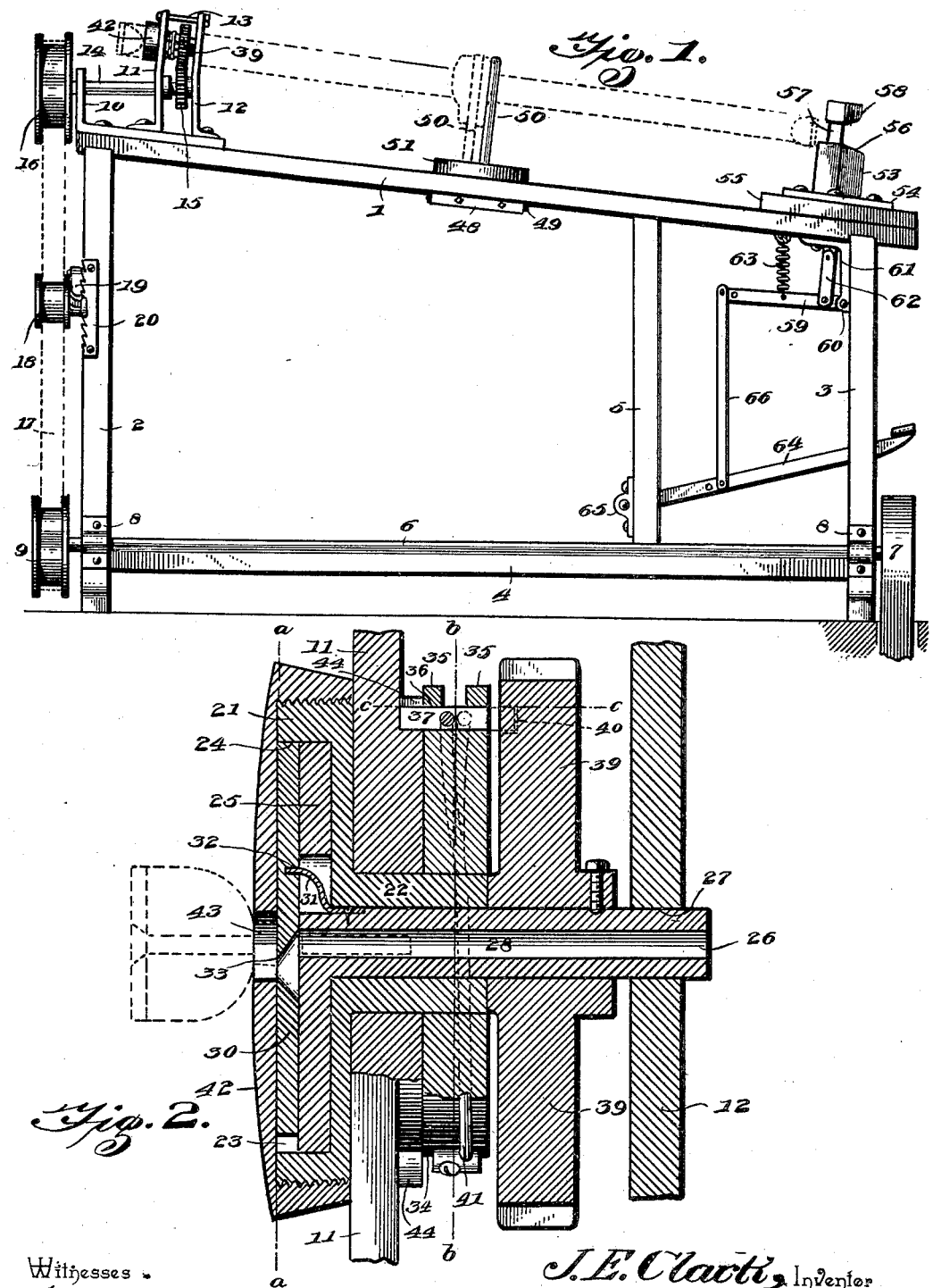

UNITED STATES PATENT OFFICE.

JOHN EDWARD CLARK, OF JANESVILLE, WISCONSIN.

TIRE BOLTER AND CUTTER.

SPECIFICATION forming part of Letters Patent No. 678,719, dated July 16, 1901.

Application filed April 4, 1901. Serial No. 54,355. (No model.)

*To all whom it may concern:*

Be it known that I, JOHN EDWARD CLARK, a citizen of the United States, residing at Janesville, in the county of Rock and State of Wisconsin, have invented a new and useful Tire Bolter and Cutter, of which the following is a specification.

My invention is an improved machine for screwing up the nuts on tire-bolts, cutting off the projecting ends of the bolts, and shaping the felly-plates of vehicle-wheels; and it consists in the peculiar construction and combination of devices hereinafter fully set forth and claimed.

In the accompanying drawings, Figure 1 is a side elevation of a machine for screwing up the nuts on tire-bolts, cutting off the projecting ends of the bolts, and shaping the felly-plates of vehicle-wheels constructed in accordance with my invention. Fig. 2 is a detail sectional view of the mechanism for screwing up the nuts on the tire-bolts and cutting off the projecting ends of the bolts. Fig. 3 is a detail sectional view of the same, taken on a plane indicated by the line *a a* of Fig. 2. Fig. 4 is a similar view taken on a plane indicated by the line *b b* of Fig. 2. Fig. 5 is a similar view taken on a plane indicated by the line *c c* of Fig. 2. Fig. 6 is a detail sectional view of the felly-plate setter. Figs. 7 and 8 are detail sectional views of the supporting-spindle for the vehicle-wheel and the means for supporting said spindle and permitting the longitudinal movement thereof.

The frame of the machine comprises an inclined bar 1, supporting-legs 2 3 at the ends thereof, a bar 4, which connects the lower portions of said supporting-legs, and a vertical bar 5, which connects the bars 1 4. A shaft 6, which is driven by a pulley and belt 7, is journaled in bearings 8 on the supporting-legs 2 3 and is provided at one end with a pulley 9. On the frame 1, at one end thereof, are a bearing 10, a head 11, and a standard 12. A bolt 13 connects the upper end of the head and standard. A shaft 14 is journaled in the bearing 10 and in bearings with which the head 11 and standard 12 are provided. Said shaft has a spur-wheel 15 thereon, which is disposed between the head and standard and is fast to said shaft. The latter has at its outer end a pulley 16, which is connected to the pulley 9 on the driving-shaft 8 by a slack belt 17. A belt-tightening pulley 18, which is carried by a spring-lever 19, is employed for the purpose of tightening the belt 17 when it is desired to communicate power to the shaft 14 and for slackening said belt in order to throw said shaft 14 out of operation. The said spring-lever 19 is pivotally attached to the leg 2 and is engaged by a rack-plate 20 thereon, the latter supporting said spring-lever at any desired adjustment.

A cylindrical head 21 has a sleeve 22 projecting from one side thereof, which sleeve is journaled in a bearing with which the head 11 is provided. The said head 11 will be hereinafter referred to as the "fixed" head. The said cylindrical revoluble head 21 has a circular rabbet 23 in its face, which rabbet has on one side a cam 24. A disk 25, which is concentrically disposed in the revoluble head 21, is fitted in the rabbet 23 thereof and is provided with a shaft 26, that projects from one side thereof, and is journaled in the sleeve 22 of revoluble head 21 and in a bearing 27, with which the standard 12 is provided. The said shaft 26 is provided with a central bore 28 of suitable diameter, which extends from one end of said shaft to the other and through the disk 25 at the center of the latter. Said disk 25 is provided with a transverse way 29, in which is fitted a knife-plate 30, that is revolved by the said disk 25 and is adapted to move at right angles to the axis thereof. The said knife-plate is moved in one direction by the cam 24 and in the reverse direction by a spring 31. Said knife-plate has a circular opening 32 and is provided with an annular cutting edge 33. The sleeve 22 of revoluble head 21 projects beyond the inner side of the fixed head 11, and to the said projecting inner portion of said sleeve 22 is fixed an annulus 34, which rotates with said revoluble head 21. Said annulus is provided on one side of its periphery with projecting lugs 35, which are radial and are provided with transverse openings 36, in which operates a locking-bolt 37, the rear end of which is provided with an oblique engaging face 38. A spur wheel 39 is fast on the shaft 26 and engages the spur-wheel 15, and hence communicates power to the shaft 26. In one side of the said spur-wheel 39 is a notch 40, which is normally engaged by the oblique-faced rear end of the bolt 37. The latter is normally retained in engagement with the said notch by a spring 41, which is carried by the annulus 34. Hence while the locking-bolt is engaged with the spur-wheel 39 the latter when it is rotated by the spur-wheel 13 imparts rotary motion to the head 21, the disk 25, and the annulus 34. On the outer side of the revoluble head 21 is secured a cap 42, the face of which is convex, as shown, at the center of which is an angular opening 43 of a suitable size to receive a nut on a tire-bolt. The fixed head 11 is provided on its rear side with stops 44, which are adapted to be engaged by the locking-bolt 37 when the latter is out of engagement with the spur-wheel 39 to arrest the rotation of the annulus 34, and hence also arrest the revoluble head 21 and the cap 42 covered thereby, while permitting the disk 25 to continue to rotate with said spur-wheel 39.

At or near the center of the bar 1 is a slot 45, which is longitudinal of the said bar. A base-plate 51 is placed on the bar 1 above said slot and is adapted to slide on said bar. A spindle 50 passes through an opening in the center of said base-plate. The diameter of said opening slightly exceeds that of said spindle. Plates 46 are secured to the under side of said base-plate, the inner portions of said plates 46 being downturned, as at 47, disposed parallel with each other, and adapted to operate in the slot 45. An oblong yoke-frame 48, which forms a guideway, is bolted or otherwise secured to said down-turned portions of said plates 46. Horizontal outwardly-extended flanges 48ª at the upper sides of said yoke-frame bear under the bar 1. A longitudinal bolt 49 extends from end to end of the yoke-frame or guideway 48 and passes through an opening in the lower end of spindle 50. Springs 52, which are of equal strength, bear against the front and rear sides of spindle 50 and normally retain the latter in a vertical position.

A vehicle-wheel is mounted on the spindle 50 and adapted to be rotated thereon, said spindle passing through the hub of the wheel. A tire-bolt is fitted in place on one side of the wheel, the nut started thereon manually, and the operator then draws the vehicle-wheel, together with the spindle 50, to one side, passing the rim or felly of the wheel over the fixed head 11 and standard 12 and causing the inner side of the felly to rest against the revoluble cap 42, with the nut on the inner end of the tire-bolt engaged by the angular opening 43. The operator then tightens the slack bolt 17 in the manner and by the means hereinbefore described, thus causing the shaft 14 and gear 15 to rotate, whereupon the revoluble head 21 is rotated by the gear 39 in the manner and by the means hereinbefore described, and as the said head rotates the cap 42 screws up the nut on the tire-bolt, as will be understood. As the nut is screwed upon the tire-bolt the projecting end of the latter enters the front end of the bore 28 in shaft 26. When the nut has been screwed home, the bolt 37 disengages the notch 40 in the gear-wheel 39 against the tension of the spring 41 and engages one of the stops 44 of the fixed head 11, thereby arresting the rotation of the revoluble head, and hence of the nut on the bolt, whereupon the disk 25, which continues to revolve with the wheel 39, causes the knife-plate 30 to be engaged by the cam 24 of the now stationary revoluble head, and as the projecting end of the bolt is in the opening in said knife-plate the annular cutting edge 31 thereof by the shearing motion cuts off the projecting end of the bolt, as will be understood, and the same is free to pass through the bore 28, through which it will be forced by the bolts successively treated by the machine. When the gear-wheel 39 has made a complete revolution with the disk 25 and independently of the revoluble head, which is sufficient to cause the knife-plate to cut off the projecting end of a bolt, the notch 40 of said gear-wheel 39 is by the action of the spring 41 reëngaged by the lock-bolt 37, as will be understood, and the operation described may be repeated on a succeeding tire-bolt.

I will now describe means for setting the felly-plates, which are fixed on certain of the tire-bolts at the joints between the felly-sections of the wheel.

At the end of the bar 1 opposite the mechanism for screwing up the nuts on the bolts and cutting off the ends of the latter is a block 53, which has a base 54, that is bolted on a block 55 on the upper side of bar 1. Said block 53 has its upper side formed with a jaw 56 and is provided with a vertical way in which operates the depending standard 57 of an upper vertically-movable jaw 58. The said jaws 56 and 58 are of the required shape on their proximate sides to bend a felly-plate in shape on the inner side of the felly of a wheel when the said jaw 57 is closed toward the jaw 56. A link-lever 59 has its outer end pivotally connected, as at 60, to an angle-bracket 61, which is bolted to the under side of bar 1 and to the upper portion of the leg or standard 3. The said link-lever is connected to the lower end of standard 57 by links 62. A spring 63, which has its upper end attached to the lower side of the bar 1 and its lower end attached to the link-lever 59, normally raises the latter, and hence raises the jaw 58 and opens it from the fixed jaw 56. A treadle 64 is pivotally connected to the lower end of the vertical bar 5, as at 65, and is connected to the link-lever 59 by a link 66. Hence by depressing the said treadle the jaw 58 may be closed toward the fixed jaw 56. The wheel when disengaged from the cap 42 may be drawn in the opposite direction with the movable spindle 50 to place the inner side of the felly thereof, where the felly-plate is located, between the jaws 56 and 58. The ensuing downstroke of the movable jaw 58 by the means and in the manner hereinbefore described will cause the felly-plate to be bent in the required form to fit the felly.

The straps 44 are so disposed on the fixed head that they arrest the rotation of the revoluble head, and hence of the nut, with the sides of the latter parallel with the sides of the felly.

Having thus described my invention, I claim—

1. The combination of a revoluble head adapted to engage and rotate a nut on a bolt, means to arrest the rotation of said head and a cutter operative while said head is arrested to cut off the projecting end of the bolt, substantially as described.

2. The combination of a revoluble head having means to engage and rotate a nut on a bolt, a revoluble disk, a knife or cutter carried by said revoluble disk, a cam to operate said knife, said cam being carried by said revoluble head, and means to arrest the rotation of said head, substantially as described.

3. The combination of a revoluble disk, a gear to rotate the same, a sliding cutter carried by said disk, a revoluble head having a cam to operate said cutter and adapted to engage and rotate a nut on a bolt, means to rotate said head with said disk and means to arrest the rotation of said head, substantially as described.

4. The combination of a revoluble disk having a tubular shaft, a gear fixed on said tubular shaft, a sliding cutter carried by said disk, a revoluble head incasing said disk, the shaft of the latter forming a bearing for said head, and said head being adapted to engage and rotate a nut on a bolt and having a cam to operate said cutter, an annulus fast with said head, a spring-pressed bolt carried by said annulus to engage said gear and thereby lock said head to said gear and rotate said head simultaneously with said disk and a fixed stop to engage said bolt when the latter is out of engagement with said gear and thereby arrest the rotation of said head, substantially as described.

5. In a machine of the class described, the combination of a revoluble disk having a tubular shaft, fixed bearings therefor, a gear fixed on said shaft, a sliding cutter carried by said disk, a revoluble head incasing said disk, the shaft of the latter forming a bearing for said head and said head being adapted to engage and rotate a nut on a bolt and having a cam to operate said cutter, an annulus fast with said head, a spring-pressed bolt carried by said annulus to engage said gear and thereby lock said head to said gear and rotate said gear simultaneously with said disk, a fixed stop to engage said bolt when the latter is out of engagement with said gear and thereby arrest the rotation of said head, and a spring-pressed movable spindle, for the purpose set forth, substantially as described.

6. A machine of the class described having a fixed mechanism for operating on the rim of a wheel, a laterally-shiftable spindle to support the wheel, and counteracting springs bearing on said spindle, to normally retain the same in one position and enable the spindle, together with the wheel, to be shifted to bring the rim of the wheel into operative relation to the fixed operating mechanism, substantially as described.

In testimony that I claim the foregoing as my own I have hereto affixed my signature in the presence of two witnesses.

JOHN EDWARD CLARK.

Witnesses:
JOHN S. DORAN,
FLORENCE L. McELROY.